W. F. HALE.
Portable Lever-Power.

No. 168,153.  Patented Sept. 28, 1875.

WITNESSES:  
Francis McArdle  
A. F. Levry

INVENTOR:  
W. F. Hale  
BY  
ATTORNEYS.

UNITED STATES PATENT OFFICE.

WILLIAM F. HALE, OF FLUVANNA, NEW YORK.

IMPROVEMENT IN PORTABLE LEVER-POWERS.

Specification forming part of Letters Patent No. 168,153, dated September 28, 1875; application filed July 31, 1875.

*To all whom it may concern:*

Figure 1:
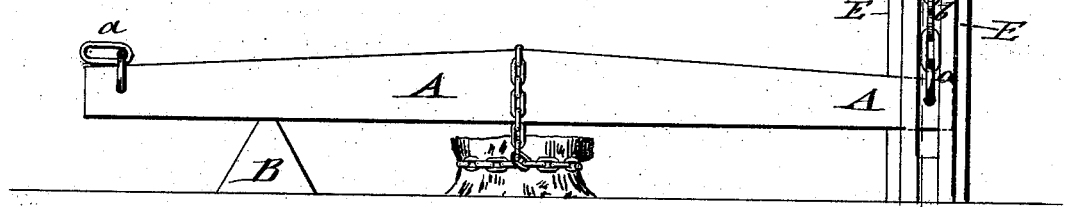
Figure 2:
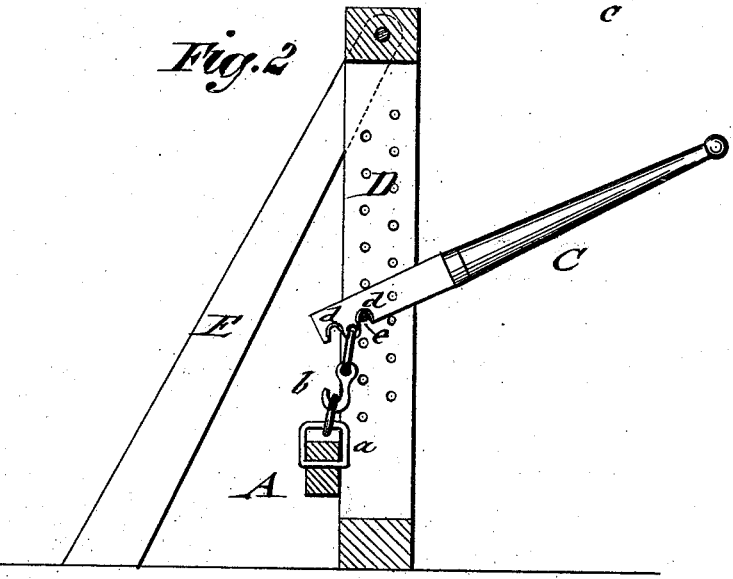

Be it known that I, WILLIAM F. HALE, of Fluvanna, in the county of Chautauqua and State of New York, have invented a new and Improved Stump-Extractor, of which the following is a specification:

In the accompanying drawing, Figure 1 represents a side elevation of my improved stump extracting and lifting device; and Fig. 2, an end view of the braced lever-supporting standard, in section on line *c c*, Fig. 1.

Similar letters of reference indicate corresponding parts.

My invention relates to an improved apparatus for raising stumps and lifting articles of heavy weight; and consists of a main lever, which rests on an adjustable fulcrum, and is attached to the stump or article to be lifted, the lever being raised by a hand-lever hooked to the opposite end, and turning on an adjustable cross-pin of a braced and perforated standard.

In the drawing, A represents the main lever, that is attached near its central part by a chain or otherwise to the stump or other article. An adjustable fulcrum-block, B, of suitable size, is placed under one end of the main lever, the opposite end being attached by a suitable bail or link, *a*, to the hook *b* of a hand-lever, C, that is used for raising the main lever. The front end of hand-lever C is provided with recesses *d*, that are strengthened by side shoulders, to rest and turn easily on the cross-pin *e* of the upright standard or post D. The hook *b* is pivoted to the end of hand-lever C, which is adjusted at different heights of the standard by passing the cross-pin through higher or lower perforations of the same. The standard D is made of two perforated posts, that are connected at top and bottom and braced by side braces E, which are, together with standard D, seated in suitable manner on the ground or floor.

After adjusting fulcrum-block and hand-lever to the beam, the stump may be pulled or the weights lifted by bringing the hand-lever down.

As one person can readily arrange the device into various positions toward the object to be acted upon, the same may gradually loosen and extract the stump or lift heavy objects with comparative ease.

The hook is pivoted to the hand-lever below the recesses, which are placed upon the cross-pins of the perforated standard, so that the lever admits effective work, whether the standards are used in a perpendicular or inclined position.

When used as a lifting-machine, single or compound power may be used at option.

A readily-adjustable leverage power for lifting light and heavy weights, applicable at any point or in any position, is thus furnished.

Having thus described my invention, I claim as new and desire to secure by Letters Patent—

The combination of lever A, working on a fulcrum, B, and a lever, C, fulcrumed at right angles thereto, the said levers being flexibly connected, as and for the purpose specified.

WILLIAM FRANKLIN HALE.

Witnesses:
CHARLES W. CARDOT,
MILTON A. HALE.